Patented July 24, 1951

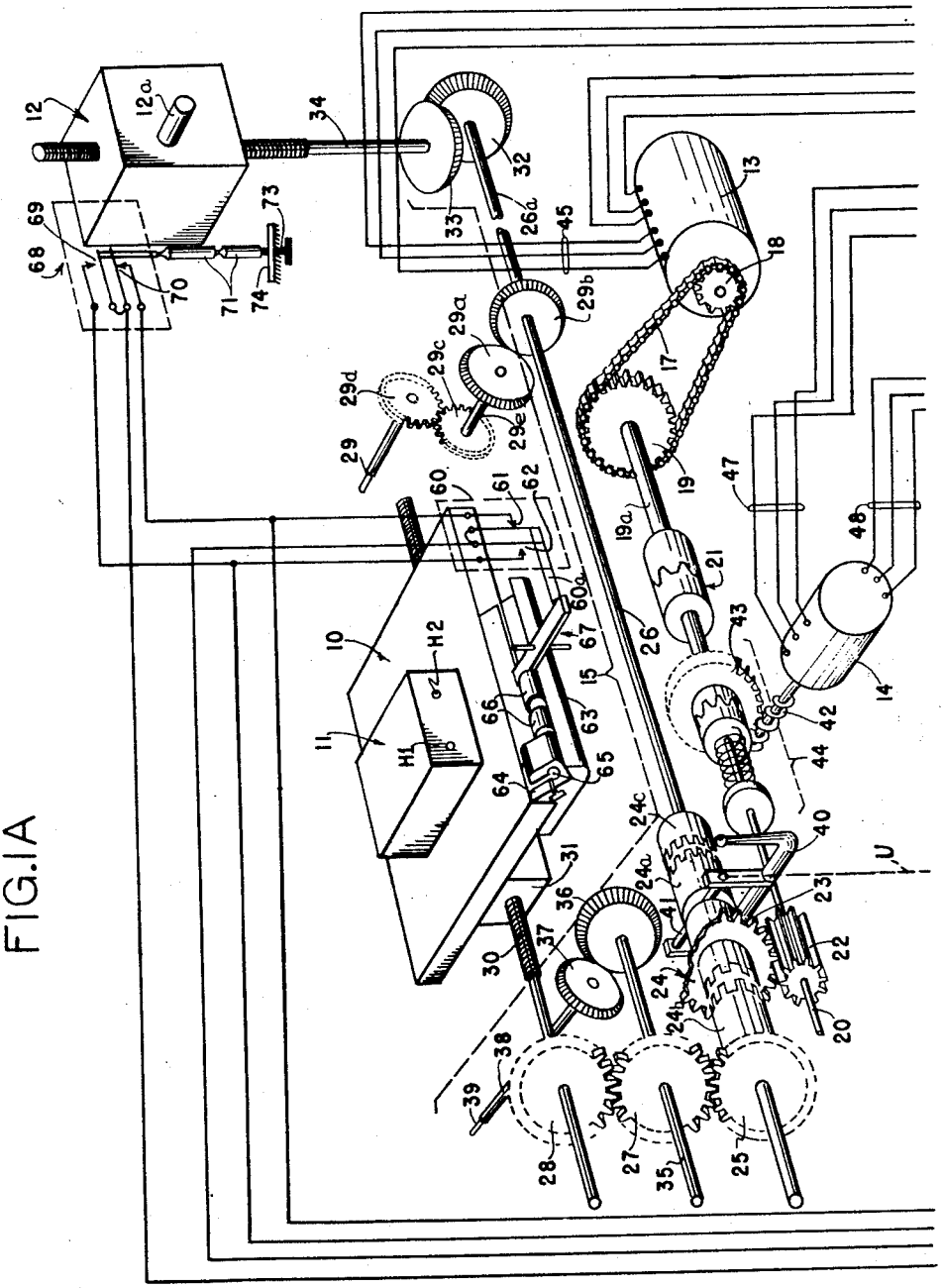

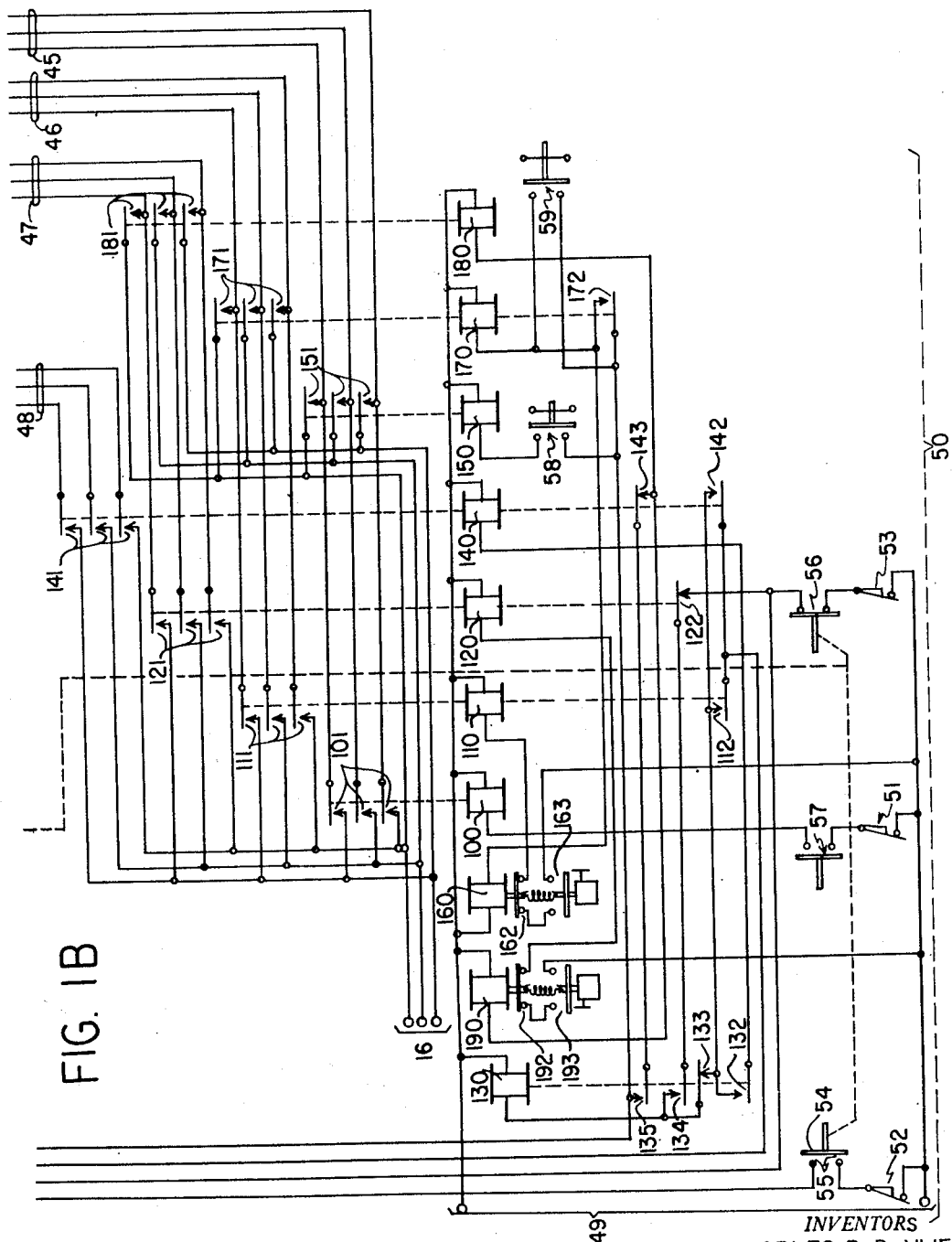

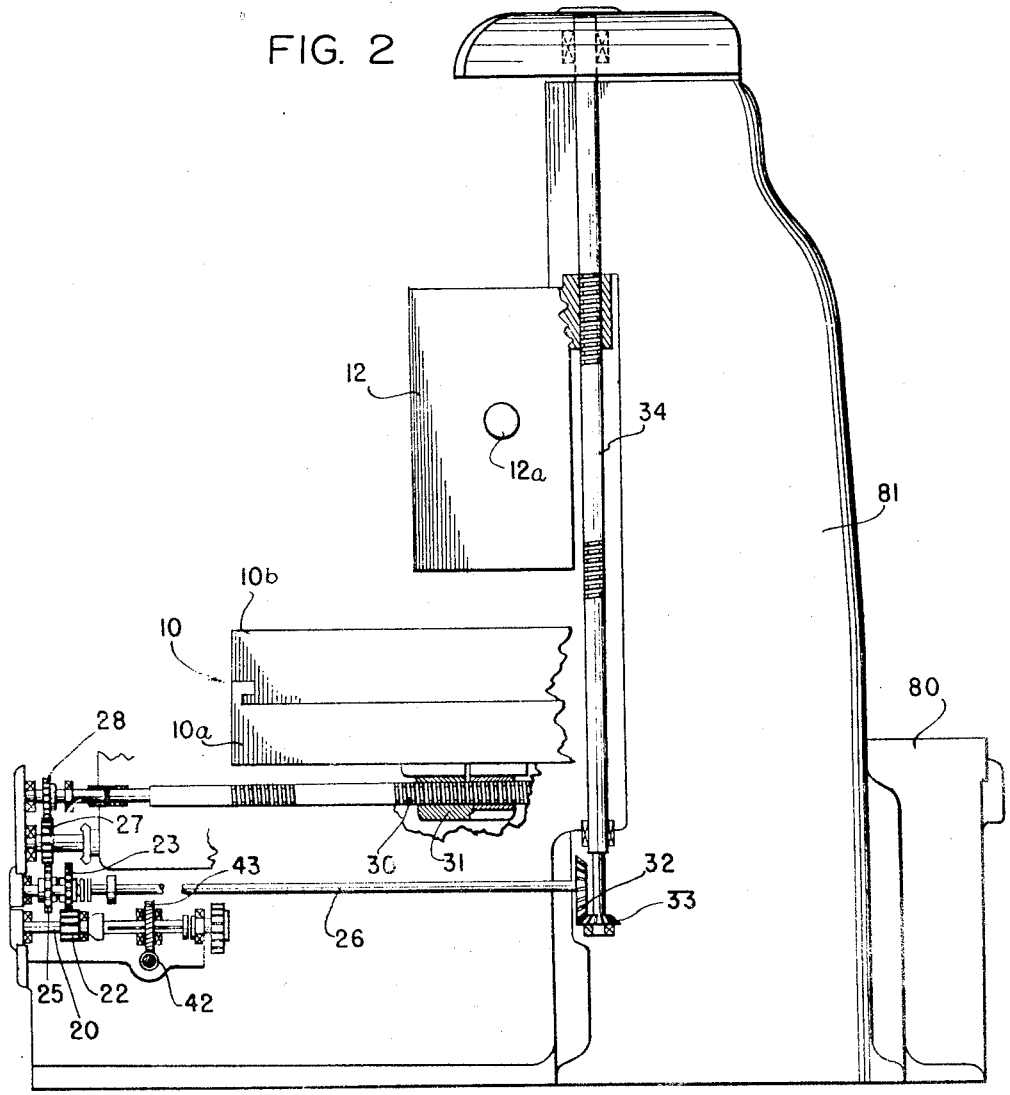

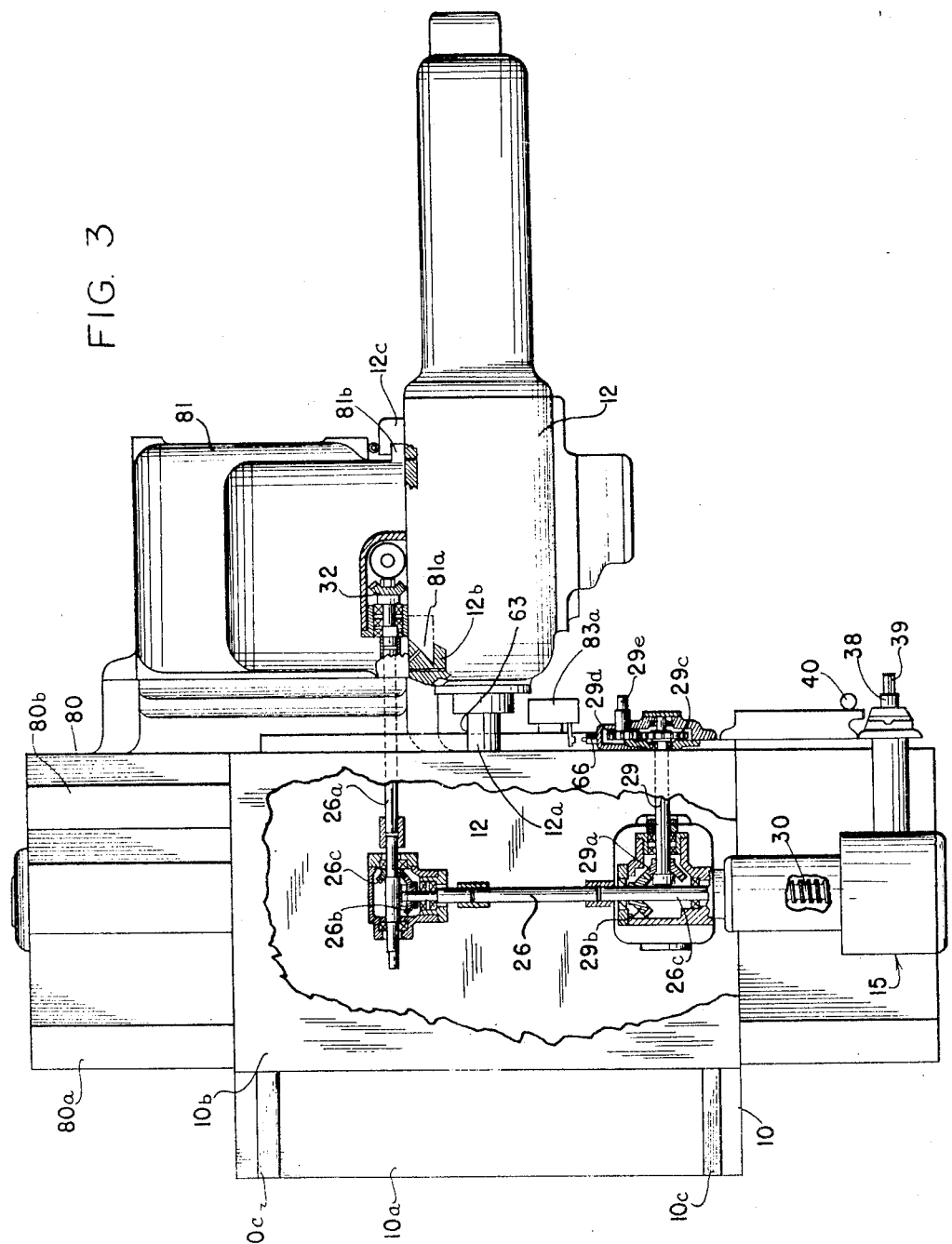

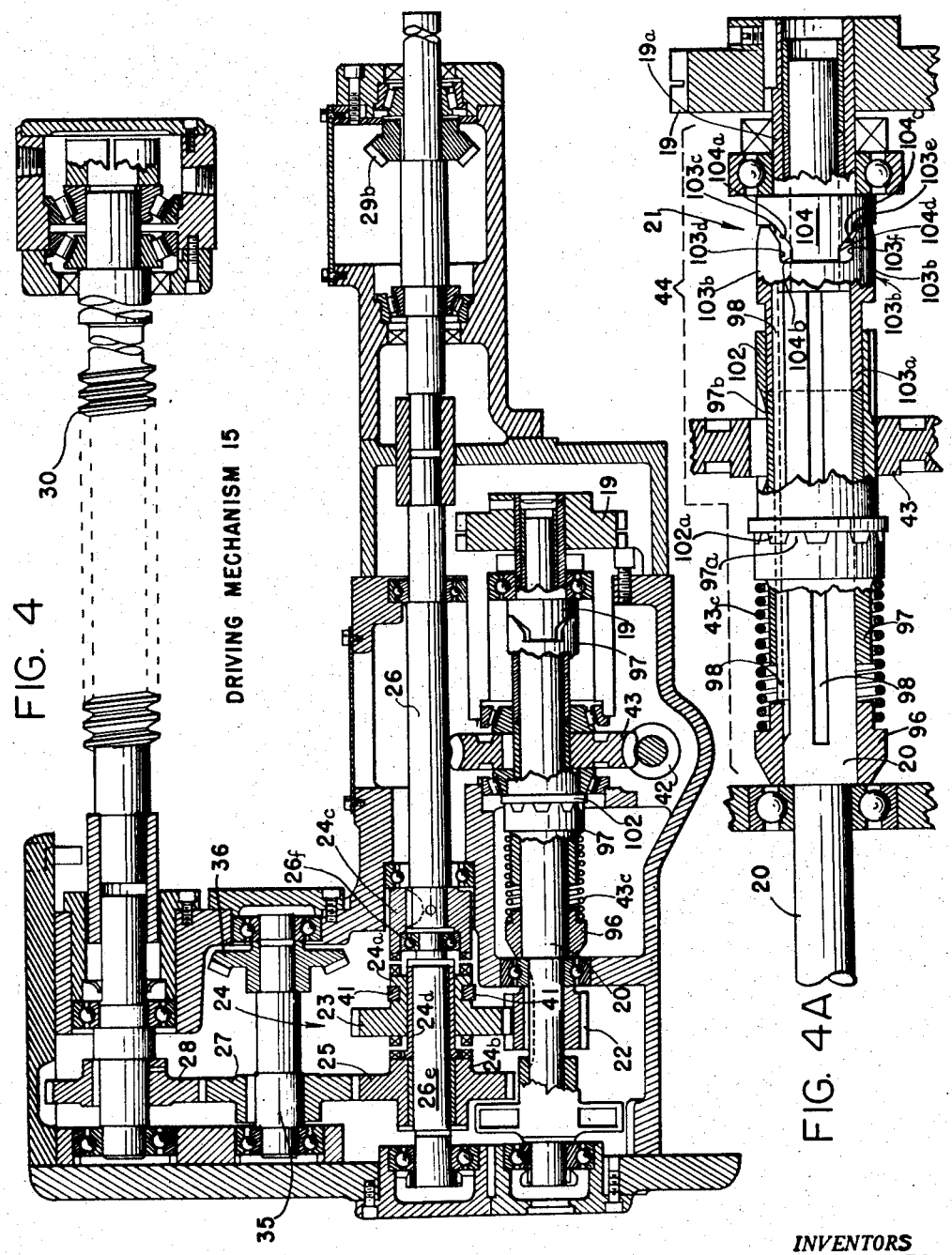

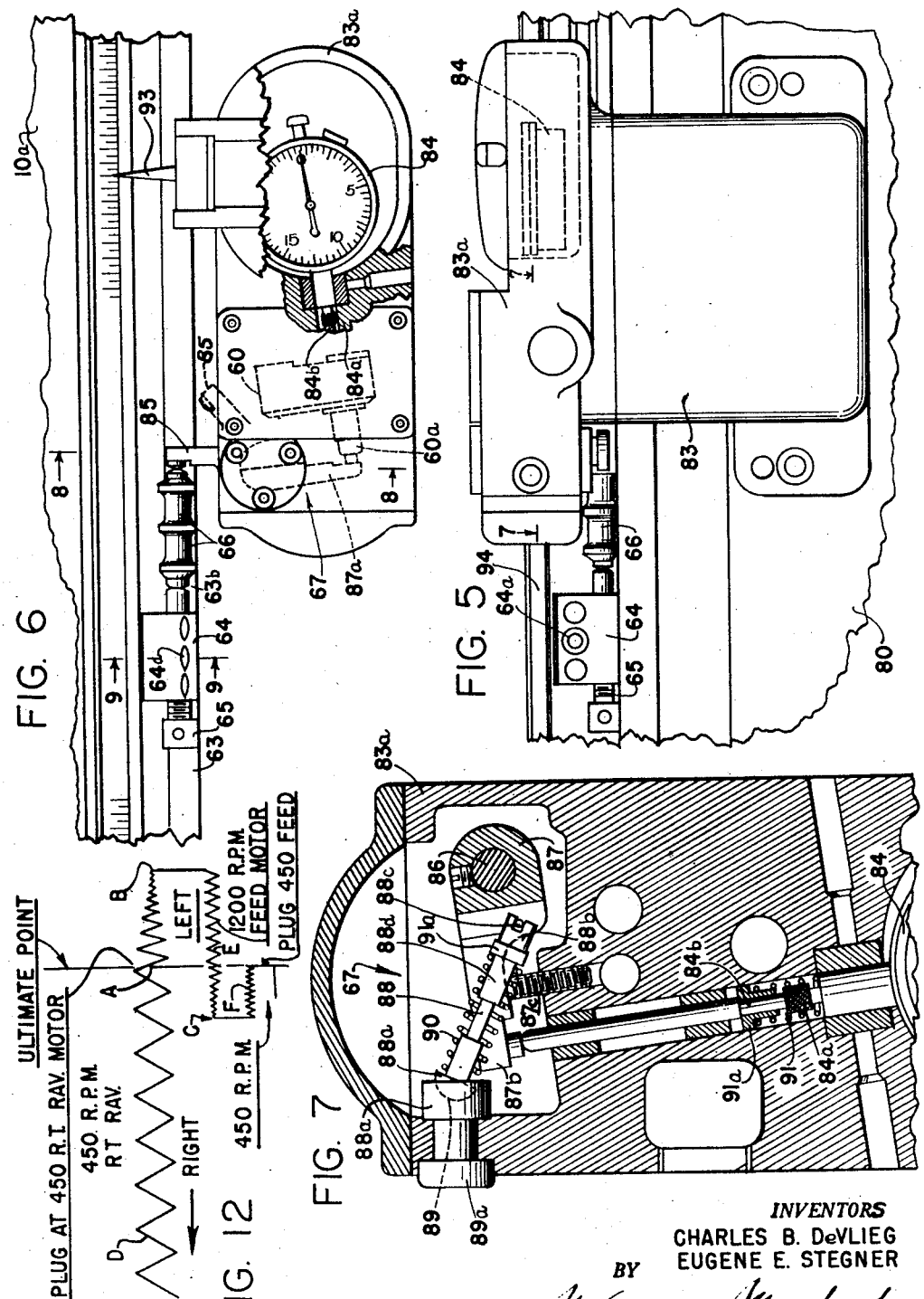

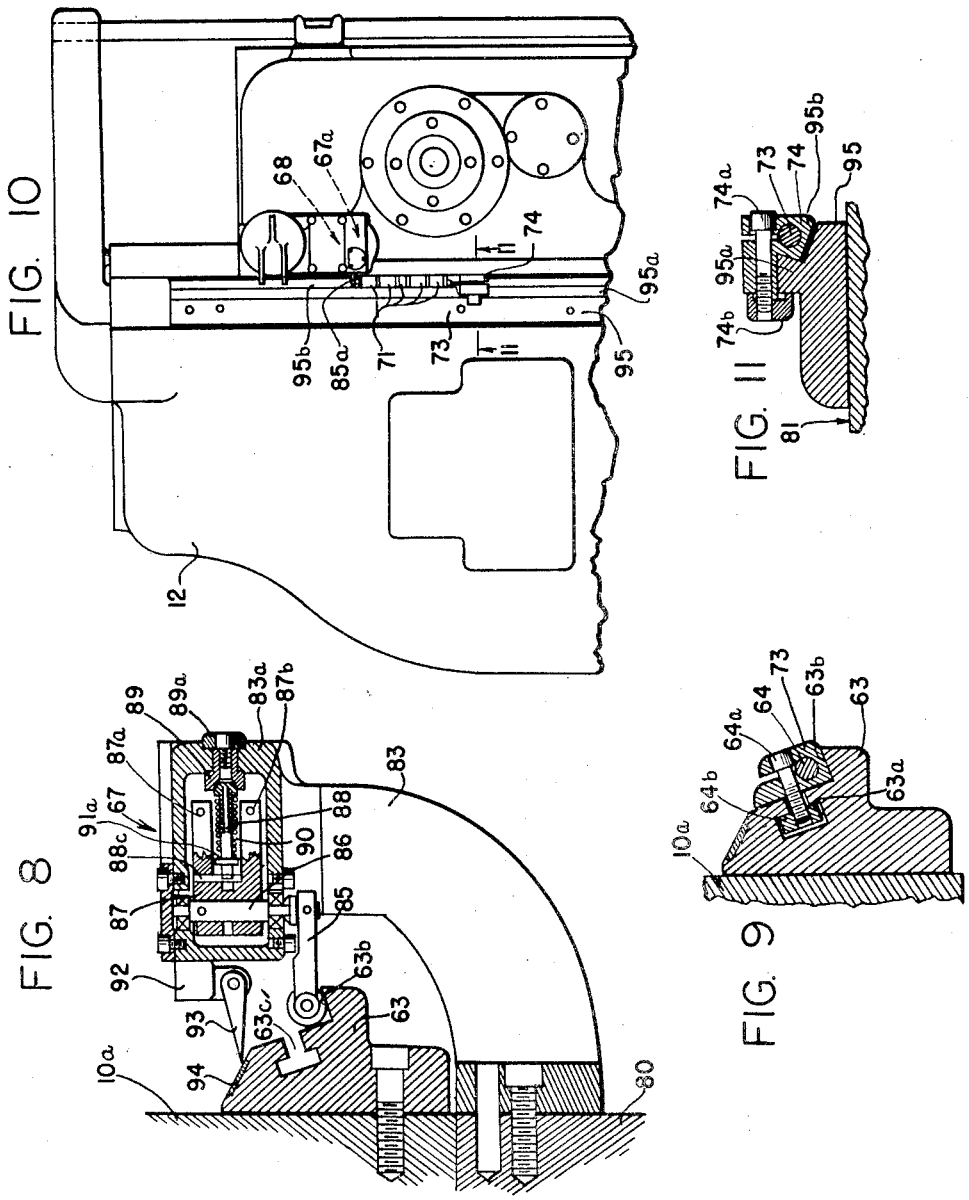

2,561,346

UNITED STATES PATENT OFFICE 2,561,346

AUTOMATIC POSITIONING MEANS FOR MACHINE-TOOL SUPPORTS AND OTHER SUPPORTS

Charles B. De Vlieg, Farmington, and Eugene E. Stegner, Detroit, Mich.; said Stegner assignor to said De Vlieg Application August 2, 1945, Serial No. 608,452

34 Claims. (Cl. 29—26)

The present invention relates to improvements in machine tools, such, for example, as milling machines and boring machines, and more particularly to improved apparatus for automatically effecting movement of the tool and work supports into preselected relative positions with precision accuracy. However, the invention is applicable to the movement of any support, carrier, or the like, where precision positioning is desired.

One of the major problems involved in precision machine tool work is that of accurately positioning the work and tool supports relative to each other in performing successive and precisely spaced operations on a work piece, and of re-establishing a preselected position of either support after the support has been moved away from the preselected position to permit inspection of the work piece. In the main, conventional machine tools are only equipped for manual positioning of the tool and work supports, such positioning being accomplished by crank operation of lead screws threaded into screw followers carried by the supports. Such machines require the use of precision blocks and micrometer indicating gauges in establishing the desired support positions, and thus require a high degree of skill on the part of the machine operators if accurate work is to be produced. Electric powered machines of the character described and employing electric motors for driving the tool and work supports have also been used commercially. In general, however, such machines have not been altogether successful, due in part to the difficulties involved in cutting the motor power at the precise instant required for stopping a tool or work support in the exact preselected position. Thus, during motor drive of a machine work support, for example, considerable kinetic energy is stored in the moving parts, certain of which, notably the work support, work piece and motor rotor, may have considerable mass. This stored energy effects continued or carry-over movement of the support after the driving motor is deenergized. The extent of carry-over is, of course, dependent upon several factors, principally the speed at which the support is moving at the time the motor power is cut, and it is for this reason that such machines usually embody both a rapid traverse motor for first moving the support rapidly toward a preselected position and a feed motor for slowly effecting final movement of the support into the preselected position.

It has been found that the lack of accuracy in support positioning in machines of the electric powered type is largely due to two factors, i. e. failure accurately to anticipate the magnitude of the carry-over movement coupled with the fact that in such machines the position responsive motor control circuits are designed to stop the support only in response to single direction movement of the support. Further errors in support positioning are introduced by failure to relax the driving connection between the feed motor and support after positioning of the support is effected and before clamping the support against further movement. Thus forces acting upon the support through the motor drive mechanism causes a slight shifting of the support position as to the clamping operation proceeds.

Furthermore, prior positioning means, both hand and power operated, are affected by such conditions as the presence of tight gibs and poorly lubricated ways which make for irregular and jerky movement of the support, resulting in inaccurate position thereof; also, stored-up stress on the gearing and driving train at the critical time of positioning is a factor contributing to inaccuracy because ordinarily vibration in the machine tends to relieve this stress and disturb the support setting unknown to the operator; also, such prior methods depend on skill and accuracy of the operator in reading the indicator dial and in manually operating the setting with the result that variables and inaccuracies are apt to occur, particularly when repositioning the support to a previously determined position. The present invention contemplates automatic positioning and repositioning to a high degree of precision in a manner overcoming such variables and inaccuracies as are here described.

It is an object of the present invention, therefore, to provide improved motor powered facilities for automatically positioning the tool or work support of a machine tool in a preselected position with a high degree of precision accuracy.

It is another object of the invention to provide machine tool support positioning facilities of relatively simple arrangement which may be easily controlled and are completely reliable in operation.

It is a further object of the invention to provide positioning facilities of the character described which may be selectively employed at will to effect movement of either the work support or tool support of a machine tool to a preselected position.

It is still another object of the invention to so arrange the support positioning facilities that at least one of the support driving motors may be controlled as desired to effect movement of either the work support or the tool support in either direction to any desired position other than the preselected support position.

The invention, both as to its organization and method of operation, together with further objects and advantages thereof, will best be understood by reference to the following specification taken in connection with the accompanying drawings, in which:

Figures 1A and 1B together form a single complete diagram schematically illustrating the essential parts of a combined milling and boring machine having embodied therein automatic work support and tool support positioning means characterized by the features of the present invention;

Fig. 2 is a rear elevational view in partially schematic form illustrating the mechanical construction of the machine;

Fig. 3 is a top plan view of the machine shown in Figure 2;

Fig. 4 is a side view, partially in section, illustrating the drive mechanism embodied in the machine;

Fig. 4A is an enlarged fragmentary view, partially in section, illustrating further details of the clutch and clutch actuating mechanism forming a part of the drive mechanism shown in Figure 4;

Fig. 5 is a fragmentary side view in elevation illustrating the position indicating and gauging facilities provided in association with the work support of the machine shown in Figures 2 and 3;

Fig. 6 is a top view partially in section of the position indicating and gauging facilities shown in Figure 5;

Fig. 7 is a fragmentary sectional view taken approximately along the lines 7—7 in Figure 5;

Fig. 8 is a sectional view taken along the lines 8—8 in Figure 6;

Fig. 9 is a sectional view taken along the lines 9—9 in Figure 6;

Fig. 10 is a side view of the gauging and position indicating facilities provided in association with the tool support of the machine;

Fig. 11 is a sectional view taken along the lines 11—11 in Figure 10; and

Fig. 12 is a graph illustrating the manner in which either of the two supports may be moved precisely to a preselected position under the control of the present improved positioning facilities.

Referring now to the drawings and more particularly to Figure 1 thereof, the present improved positioning means are there illustrated in their embodiment in a combined milling and boring machine of the character shown in the application of Charles B. De Vlieg, Serial No. 460,111, filed September 29, 1942, now Patent 2,391,398. Briefly, this machine comprises a work support in the form of a horizontally movable work table 10, and a vertically movable tool support 12 which carries a rotatable tool spindle 12a for receiving a boring tool for operating upon a work piece 11 clamped or otherwise fixedly mounted upon the work support 10. A lead screw 30 threaded through a screw follower 31 mounted upon the work support 10 at the underside thereof is utilized to convert rotary movement of the screw into horizontal movement of the work support 10 relative to the tool support 12. Similarly, a lead screw shaft 34 threaded through a screw follower embodied in the tool support 12 is employed to effect vertical movement of this support relative to the work support 10. For the purpose of effecting rapid traverse or high speed movement of either of the two supports 10 and 12, a three-phase, reversible and two-speed motor 13 is provided having high speed terminals 45 and low speed terminals 46 arranged for selective and reversed phase energization from a three-phase alternating current feeder circuit indicated by the bracketed terminals 16. In order to effect slow speed feed movement of either of the two supports 10 and 12 into a preselected position, a two-speed, reversible and three-phase alternating current motor 14 is provided having high speed terminals 48 and low speed terminals 47 arranged for selective energization from the source 16. These two motors are arranged for selective control, under the control of a control circuit indicated generally at 50, to drive either of the two supports 10 and 12 through a driving mechanism indicated generally at 15.

Briefly considered, this mechanism comprises a drive shaft 20 which is connected through sprockets 18 and 19 and a chain 17 to be driven by the rapid traverse motor 13. This shaft may also be driven by the feed motor 14 through a driving connection afforded by a worm screw 42, a worm gear 43 and a clutch mechanism 44 best shown in Figure 4A. As pointed out more fully below, this clutch mechanism is so controlled by a clutch actuator indicated generally at 21 that the clutch connection between the worm gear 43 and the shaft 20 is broken so long as torque is developed through energization of the rapid traverse motor 13. Rotary movement of the shaft 20 may be selectively transmitted to a shaft 26, utilized in driving the vertical lead screw 34 to move the tool support 12, or to a gear 25, utilized in driving the horizontal lead screw 30 to effect movement of the work support 10, through a manually settable transmission mechanism 24 which comprises a pair of relatively slidable gears 22 and 23, the first of which is mounted for rotation with the shaft 20 and the second of which is mounted for rotation with a clutch sleeve 24a freely rotatable about the shaft 26. This sleeve is arranged for sliding movement in either direction along the shaft 26 under the control of a rockable actuator 40 having an actuating element 41 riding within an annular recess within the sleeve 24a. At its two opposed ends, the sleeve 24a is provided with clutch teeth respectively engageable with the facing teeth of a clutch member 24c mounted for rotation with the shaft 26 and a clutch member 24b rotatable relative to the shaft 26 and formed integral with the gear 25. The shaft 26 is connected in driving relationship with the lead screw 34 through a connection, described below, which includes a pair of engaged bevel gears 32 and 33. Similarly, the gear 25 is connected in driving relationship with the lead screw 30 through a gear 27 mounted for rotation with an idler shaft 35 and meshing with a gear 28 mounted for rotation with the lead screw shaft 30. Manual adjustment of the work support 10 may be effected through rotation of a shaft 38 which is provided with a bevel gear 37 meshing with a bevel gear 36 mounted for rotation with the idler shaft 35. At its extended end, the shaft 38 is provided with flattened sides 39 receivable within the correspondingly shaped opening of a manually operable crank. Similarly, manual adjustment of the tool support 12 may be effected through rotation of a crank shaft 29 which is connected in driving relationship with the shaft 26 through the gears 29d, and 29c, the shaft 29e and the bevel gears 29a and 29b.

During operation of the machine in the manner described below, the desired control of the control circuit 50 is, during positioning of the work support 10, in part effected through operation of a stationary limit switch 60 which is actuated each time the work support 10 is moved through a particular preselected position. Similarly, the control circuit 50 is in part governed by a limit switch 68 movable with the tool support 12 during movement of this support into a desired preselected position. These two switches are each of the well-known Microswitch type, each being instantly and delicately responsive to infinitesimally small movements of its actuating element 60a, i. e. movements of the order of .0003 inch. Actuation of the switch 60 in response to movement of the work support 10 through a preselected position is effected through actuation of a lever mechanism indicated generally at 67 which is operated when engaged by adjustable gauging means movable with the work support 10. Specifically, the gauging means, which may be adjustable as desired to preselect the particular position to which the work support 10 is to be moved, may comprise one or a plurality of adjustable micrometer rods 66 disposed in a trough 63b of a rail 63 movable with the support 10, and a micrometer spindle 65 threaded through a spindle support 64 fixedly mounted upon the trough 63. Similarly, actuation of the Microswitch 68 in response to movement of the tool support 12 through a desired predetermined position is effected under the control of gauging means comprising one or a plurality of adjustable micrometer rods 71 and an adjustable micrometer spindle 73 threaded through a part 74 of the column which supports the tool support 12 for vertical movement.

In addition to the Microswitches 60 and 68, the electrical control circuit 50 comprises a group of contactors 120, 130, 140, 170, and 180, and a pair of magnet actuated adjustable timing devices 160 and 190 which are commonly controllable by an automatic positioning switch 59 of the self-restoring type and are selectively controllable by the two identified Microswitches to control the motors 13 and 14 in effecting movement of either the work support 10 or the tool support 12 to a desired preselected position. A manually operable and non-restoring selector switch 54 is utilized selectively to render the Microswitches 60 and 68 active in controlling the described contactors and timing devices. Operation of the rapid traverse motor 13 to produce rapid traverse movement of the work support 10 to the left or the tool support 12 upward is effected under the control of a contactor 100 which is arranged for selective energization through a self-restoring push button switch 57 and a limit switch 51. This limit switch is arranged for operation to its open circuit position when the work support 10 is moved to its extreme position to the left. Energization of the rapid traverse motor 13 to produce rapid traverse movement of the work support 10 to the right or the tool support 12 downward is under the control of an additional contactor 150 arranged for energization through the contacts of a self restoring push button switch 58 and the contacts of either the Microswitch 60 or the Microswitch 68. A limit switch 53 arranged for actuation to its open circuit position in response to movement of the work support 10 to its extreme right position is also provided in the control circuit to prevent possible continued energization of either of the two motors 13 and 14 after the work support 10 has been moved to the extreme right limit of its range of travel. Similarly, a limit switch 52 is provided in the circuit to prevent movement of the tool support 12 beyond the lower-most limit of its range of travel.

The machine construction

In general, the construction of the machine in which the present improved support positioning facilities are provided is substantially as shown in the De Vlieg application abovementioned, but it should be understood that this is only for purpose of illustration and that the invention is applicable to machine tools generally, wherever precision positioning of support members is desired. Briefly, and referring particularly to Figures 2 and 3 of the drawings, the machine comprises a bed 80 having vertically aligned and horizontally spaced ways 80a and 80b along the top thereof upon which the work support 10 is slidably supported for movement in a horizontal plane. This support is of two-part construction, comprising a lower member 10a (commonly termed a "saddle") directly slidably supported upon the ways 80a and 80b, and provided with horizontally spaced slide ways 10c which slidably support a top member 10b (commonly termed a "work table" or "platen") for movement in a horizontal plane but at right angles relative to the line of movement of the saddle 10a relative to the bed 80. The bed 80 also fixedly supports the usual vertical column 81 upon which the tool support 12 is slidably mounted for up and down movement in a vertical plane by means of ways 81a and 81b integral with the column 81 and slide members 12b and 12c forming a part of the support 12 and defining ways for slidably receiving the ways 81a and 81b. In this instance the driving mechanism is mounted upon the bed 80 at a level below the work support 10. Specifically, and as best shown in Figure 3 of the drawings, this mechanism is disposed substantially centrally between the sides of the bed 80, and the manually adjustable shafts 29 and 38 for respectively manually positioning the work and tool supports are brought out through one side of the bed. The tool support actuating shaft 26 extends longitudinally of the bed 80 and carries a bevel gear 26b which meshes with a bevel gear 26c carried by a second shaft 26a. The latter shaft mounts the bevel gear 32 through which rotary movement is imparted to the lead screw 34 utilized in vertically positioning the tool support 12.

The driving mechanism 15

Referring now more particularly to the structural arrangement of the driving mechanism 15, the manner of rotatably supporting the various elements of this mechanism will be readily apparent from a consideration of the bearing and housing assembly illustrated in Figure 4 of the drawings. As there shown, the gear 23 through which rotary motion is selectively imparted to the lead screw 30 and the horizontal drive shaft 26, is integrally formed with the clutch member 24a, which latter member is slidably and rotatably supported upon a sleeve 24d carried by a rotatable shaft 26e. At its right end this shaft is journaled within a bearing 26f, the outer race of which is mounted for rotation with the clutch part 24c. This clutch part is in turn pinned or keyed to the left end of the shaft 26 for rotation therewith. The movable clutch member 24a may be moved to the left from its illustrated neutral position to bring the clutch teeth at the left end thereof into engagement with the teeth of the clutch part 24b by suitable actuation of the actuator element 41 which connects with the actuator 40. Conversely, by sliding the movable clutch part 24a to the right from its illustrated neutral position, through suitable reverse actuation of the actuator element 41, the teeth at the right end of the clutch part 24a are brought into clutching engagement with the teeth of the clutch part 24b to establish a driving connection with the shaft 26.

Briefly, to consider the structural arrangement of the clutch 44 and clutch actuator 21 through operation of which the feed motor 14 is selectively rendered operable to drive the shaft 20, it is first pointed out that the worm gear 43 driven from the worm screw 42 of the feed motor rotor shaft is keyed to a sleeve 102 (Figure 4A) which at its left end is provided with clutch teeth 102a. These teeth are engageable with the teeth 97a of a second clutch sleeve 97 which is slidable longitudinally of the shaft 20 and is keyed or splined thereto as indicated at 98. The clutch sleeve 97 is provided with an integral oppositely extending sleeve portion 97b which extends into and is freely rotatable within the sleeve 102. At its right end this sleeve abuts the left end of a clutch actuator 103b having a sleeve portion 103a which also extends within the sleeve 102 and is rotatable relative to this sleeve. Like the clutch sleeve 97, the actuator sleeve 103a is splined to the shaft 20 for rotation therewith by means of the splines 98. At its right end the actuator 103 is provided with clutch actuator jaws 103b engageable with the jaws 104 of a clutch actuator sleeve 19a upon which the sprocket 19 is mounted. Specifically, the jaws 103b and 104 are provided with two sets of engageable camming surfaces 103c, 104a and 103e, 104c utilized in effecting movement of the sleeves 103 and 97 to the left to effect disengagement of the clutch teeth 97a and 102a. The jaws 103b and 104 are also provided with two sets of engageable stop surfaces 103d, 104b and 103f, 104d having the function of transmitting torque from the sprocket 19 to the shaft 20 through the parts 103 and 98. Normally, the clutch teeth 97a and 102a are maintained in clutching engagement to provide a driving connection between the worm gear 43 and the shaft 20 by means of a helical coil spring 43c held under compression between the shouldered end of the sleeve 97 and the shouldered portion of a collar 95 within which the shaft 20 is rotatably disposed.

With the above-described arrangement, the parts 103 and 19a of the clutch actuator 21 function to maintain the clutch teeth 97a disengaged from the clutch teeth 102a so long as the rapid traverse motor 13 is operating to drive or apply torque to the sprocket 19 through the chain 17 and the rotor sprocket 18. Thus, so long as the sprocket 19 is rotated in one direction through operation of the motor 13 or is being reversely driven through the driving connection during a plugging interval against the braking action of the motor 13, the camming surfaces 103c and 104a coact to move the sleeves 103a and 97 to the left along the shaft 20 against the bias of the spring 44c until the stop surfaces 103c and 103d are engaged with the surfaces 104a and 104b respectively. Such engagement of the identified stop surfaces is maintained so long as driving torque is developed between the shaft 20 and the sprocket 19, either during the driving or plugging interval. The extent of such longitudinal movement of the sleeve 97 along the shaft 20 is sufficient to fully disengage the teeth 97a from the teeth 102a such that the driving connection between the worm gear 43 and the shaft 20 is completely broken. Accordingly, the feed motor 14 may be operated without effect during a period when the rapid traverse motor 13 is operating to drive one of the two supports 10 and 12 or to plug the support to a stop. Similarly, the camming surfaces 103e and 104c coact to shift the sleeves 103 and 97 to the left to disengage the clutch teeth 97a and 102a when torque is developed between the shaft 20 and the sprocket 19 in the reverse direction, either through reverse rotary movement of the rapid traverse motor 13 to drive one of the two supports, or during operation of this motor to plug the support to a stop. It will thus be apparent that the actuator 21 and the clutch 44 are so arranged that when the rapid traverse motor is energized, the driving connection between the feed motor 14 and the shaft 20 is broken. When, however, the rapid traverse motor is deenergized, the spring 43c acts to shift the two parts 97 and 103 to the right sufficiently to produce full engagement of the teeth 97a and 102a, whereby the worm gear 43 is clutched to the shaft 20 to establish a driving connection therebetween. In this regard it is noted that during operation of the feed motor 14 to drive the shaft 20 at slow speed through the gear reduction afforded by the worm 42 and gear 43, the rotor of the motor 13 is driven at a speed somewhat in excess of the speed of rotation of the shaft 20 through the clutch actuator 21, the sprocket 19, the chain 17 and the sprocket 18.

*Position gauging means*

As best shown in Figures 5, 6, 7 and 8 of the drawings, the gauge and Microswitch assembly associated with the work support 10 is mounted within a housing 83a supported at the top of a bracket member 83 rigidly mounted upon the bed 80 to one side thereof. Specifically, the housing 83a is employed to house the Microswitch 60, the parts of the lever mechanism 67 and a micrometer gauge 84 utilized visually to indicate movement of the work support 10 to a position beyond a particular preselected position. The gauge 84 is provided with the usual actuating plunger 84a arranged for actuation by the lever mechanism 67 through a spring biased actuating rod 84b slidably supported within a bore through the housing 83a. This rod and the actuating plunger 60a of the Microswitch 60 are adapted for actuation by the two arms 87a and 87b of a lever 87 carried by a pivot shaft 86 suitably journalled in the housing 83a. As best shown in Figure 8 of the drawings, the shaft 86 mounts an actuating arm 85 at its lower end having an end projected into the path of movement of the end micrometer block 66 disposed within the trough 63b of the rail 63. A coil spring 91 (Figure 7) reacting between the housing 83a and a shouldered collar 91a fixedly mounted upon the rod 84b acts normally to bias the lever 87 and associated parts 85 and 85 against actuation of the Microswitch actuating plunger 60a and the gauge actuating plunger 84a. This spring bias is counterbalanced by means of an oppositely acting bias assembly which comprises a spring biased rocker rod 88. The rod 88 is slidably supported by a ball-ended sleeve 88a and carries a shouldered ferrule 88d having a slotted end 88b for seating a cross pin 88c which extends between the lever arms 87a and 87b. The ball end of the sleeve 88a is seated within a ball socket 89 which has a shank extending through the wall of the housing 83a and is internally threaded to receive an assembly screw 89a. A spring 90 surrounding the parts 88a, 88 and 88d and reacting between the shouldered parts 88a and 88b, provides a force acting between the lever 87 and the housing 83a which opposes the oppositely directed force of the spring 91. Specifically, and as best shown in Figure 7 of the drawings, the force exerted by the spring 90 is along the line offset with respect to the line passing through the center of the shaft 86 and the center of the ball and socket support for the sleeve 88a. This force tends to rotate the lever 87 in a counter-clockwise direction, whereas the spring 91 acting upon the rod 84b tends to rotate the lever 87 in a clockwise direction. By suitable design of the springs 90 and 91, these oppositely directed forces may be so proportioned that an absolute zero reading of the micrometer gauge 84, together with bare touching engagement of the lever arm 87a with the actuating plunger 60a of the Microswitch 60, is obtained with the lever 85 completely disengaged from the micrometer blocks 66 carried by the trough 63b. The lever 87 is held in this condition by the greater force of the spring 90 which normally holds the lever arm 87a against an adjustable stop 87c, as shown in Figure 7. This stop 87c is threaded into the housing 83a and is adjusted when the machine is set up to properly position the lever arm 85 and its contact point with relation to micrometer switch 60 and the zero reading of the micrometer gauge 84. The lever arm 85 may be moved clockwise, Figure 6, until the pin 88c passes the centerline between the parts 86 and 88a, whereupon the spring 90 holds said lever arm and its lever 87 in the opposite or out-of-action position indicated by the dotted line position of the lever arm 85. This is for clearance of the blocks 64—66. Manual release of the lever arm 85 from this position causes it to be returned by the spring 90 to the operative position.

As indicated above, the micrometer block or blocks 66, which may be required in causing the desired preselected position to be imparted to the work support 10, are adapted for support within a trough 63b formed along the side of a rail 63 which is fixedly carried by the lower member 10a of the work support 10. This rail is also provided with a longitudinally extending T-slot 63a which is used in adjustably positioning the micrometer screw support 64 along the trough 63b. Specifically, the micrometer screw 65 is threaded through the support 64, and the support is split and drilled to receive a clamping screw 64a. The threaded shank of this screw extends through the stem of the T-slot 63a to engage the nut 64b adjustable along the cross portion of this slot. With this structure, the micrometer screw support 64 may be obviously moved to different positions along the rail 63 and may be clamped in a selected position through actuation of the clamping screw 64a. At any selected position, the micrometer screw 65 may be adjustably threaded through the support 64 in order accurately to position one or more micrometer blocks along the trough 63b.

For the purpose of providing an approximate indication of the position of the work support 10 relative to the axis of rotation of the tool spindle 12a, the housing 83a is provided with a projection 92 which is utilized pivotally to support an indicating arm 93. This arm is cooperable with a ruled insert 94 disposed within a recess extending longitudinally of the rail 63 to provide the desired approximate indication of the position of the work support 10 relative to the tool spindle axis.

In its details, the gauge and Microswitch assembly associated with the tool support 12 is identical with the assembly just described and provided in association with the work support 10. It is noted, however, that the gauge and Microswitch assembly provided to control the positioning of the tool support 12 is mounted upon this support for movement therewith in the manner best illustrated in Figure 10 of the drawings. Actuation of the lever mechanism 87a of this assembly is effected through engagement of the actuating lever 85a embodied in this assembly with a micrometer block 71. Specifically, these blocks may be stacked one above the other in the number required in the trough 95b of a rail 95 fixedly mounted upon the vertical column 81 in a vertical position. This rail is provided with a rail rib 95a extending longitudinally thereof which is used slidably to support a support 74 for the micrometer screw 73. The micrometer screw 73 is threaded through the support 74, and the support is split and drilled to receive a clamping screw 74a which is threaded into a clamping nut 74b. With this structure, the micrometer screw support 64 may obviously be moved to different positions along the rail rib 95a and may be clamped in a selected position through actuation of the clamping screw 74a. At any selected position of the support 74, this screw may be adjustably threaded through the support 74 for the purpose of accurately positioning one or more micrometer blocks along the trough 95b. Thus, it will be understood that the Microswitch 68 and position indicating gauge of the gauge assembly associated with the tool support 10 are adapted for actuation in response to movement of the tool support 12 from an elevated position downwardly to a desired preselected position relative to the work support 10.

*Operation of the machine*

In considering the operation of the machine, it may be assumed that a work piece 11 has been fixedly clamped to the top of the work support 10 and that two holes $H_1$ and $H_2$ are to be bored into this piece along the side facing the boring spindle 12a. It may be assumed further that the hole $H_1$ is to be bored at a position located 2.005 inches from the left edge of the work piece and the same distance from the top edge of the piece. With this position determined from available drawings a micrometer block 66 of appropriate length and adjustment of the micrometer spindle 65 are required in setting up for automatic positioning of the work support 10 in the desired position. Specifically, with the position of the left edge of the work piece 11 relative to the work support 10 known and the position of the work support relative to the axis of rotation of the tool spindle 12a known, the work support may be first accurately positioned to center the rotational axis of the tool spindle 12a 2.005 inches in from the left edge of the work piece through manual adjustment of the work support to the desired position. Following this, the micrometer screw support 64 is adjusted along the rail 63 to permit a micrometer block of accurate length to be inserted into the trough 63b. The support 64 is next clamped in position and the screw 73 adjusted until the indicating needle of the gauge 84 is exactly at its zero setting. The work support 10 may now be moved to the left in preparation for automatic positioning of the work support. Similarly, adjustment of the micrometer spindle 73 and the use of one or more micrometer blocks 71 may be required in positioning the tool support 12 to bring the tool spindle 12a into the desired boring position relative to the work piece 11.

Assuming that automatic positioning of the work support 10 is to first be effected, the transmission mechanism 24 is shifted through operation of the actuator 40 to a position wherein the teeth of the clutch sleeve 24a are engaged with the teeth of the clutch member 24b, thereby to establish a driving connection between the shaft 20 and the lead screw 30. Incident to this operation, the uni-control connection U is actuated to shift the selector switch 54 to a position wherein the contacts 56 thereof are closed and the contacts 55 are open.

To initiate the automatic positioning operation, the automatic position switch 59 is momentarily actuated to complete a circuit through the normally closed contacts 61 of the Microswitch 60, the contacts 56 and the contacts of the limit switch 53 for energizing the contactor 170 and the operating magnet of the timing device 160 in parallel from the current source 49. When thus energized, the contactor 170 closes it contacts 172 to complete an obvious locking circuit for itself and the operating magnet of the timing device 160. When the magnet of the timing device 160 is thus energized, this device operates to open its contacts 162 and then closes its contacts 163, thereby to prepare a circuit for energizing the rapid plug left contactor 110. At its contacts 171, the contactor 170, upon operating, connects the terminals 46 of the rapid traverse motor 13 to the conductors of the three-phase current source 16 in the proper phase relationship to effect movement of the work support 10 the right.

When thus energized, the rapid traverse motor 13 acts to drive the work support 10 to the right through the driving connection afforded by the sleeve 19a, the shaft 20, the engaged gears 22 and 23, the clutch 24, the meshing gears 25, 27 and 28, the lead screw 30, and the screw follower 31. The torque thus developed in the shaft 20 causes the clutch actuating parts 21 to function in the manner explained above to disengage the clutch teeth 97a and 102a, and thus break the driving connection between the feed motor 14 and the shaft 20. Rapid traverse movement of the work support 10 to the right continues at a speed indicated by the amplitude of the variations in the saw tooth line D shown in Figure 12 of the drawings until it reaches the preselected position indicated at A along this line. At this point, the leading end of the micrometer block 66 engages the actuating lever 85 of the lever mechanism 67 to effect instant operation of the micrometer switch 60 from its illustrated normal position to its off-normal position wherein the contacts 61 are opened and the contacts 62 are closed. When the contacts 61 are thus opened, the described operating and locking circuits for the contactor 170 and the operating magnet of the timing device 160 are interrupted.

In releasing, the contactor 170 opens its contacts 171 to disconnect the motor terminals 46 from the current source 16. At its contacts 172, the contactor 170 opens another point in the locking circuit for itself and the operating magnet of the timer 160. The timer 160 now starts to time out and in so doing first closes its contacts 162 to complete a circuit through its contacts 163 for energizing the contactor 110. In operating, the contactor 110 closes its contacts 111 to connect the winding terminals 46 of the rapid traverse motor 13 to the source 16 with one of the phases thereof reversed; that is, the motor 13 is energized with current of the proper phase to drive the support 10 to the left. Due to the kinetic energy stored in the moving parts of the driving mechanism, the support 10 and the work piece 11, however, the work support continues to move in the same direction beyond the preselected position against the torque developed by the described reverse phase energization of the rapid traverse motor 13. In other words, the motor 13 acts to brake or plug the moving system to a stop. Incident to such reversal in the direction of the torque developed by the motor 13, the clutch actuator 21 is momentarily released to establish a driving connection between the feed motor 14 and the shaft 20, and is then reactuated to break this connection.

The timer 160 is assigned the function of maintaining the reverse phase energization of the rapid traverse motor 13 only for the interval required to bring the work support 10 to a stop. In this regard it is pointed out that this timer is preferably an adjustable orifice device such that it may be set to measure any desired time interval within certain limits. The structural arrangement is such that its contacts 163 are automatically opened a predetermined time interval after its contacts 162 are closed. Accordingly, when the work support 10 is stopped through the plugging action of the rapid traverse motor 13, the contents 162 are opened to deenergize the contactor 110.

Upon operating in response to closure of the contacts 163 in the manner explained above, the contactor 110 also closes its contacts 112 to complete a circuit through the engaged contacts 62 of the Microswitch 60 and the break contacts 133 of the contactor 130 for energizing the latter contactor. In operating, the contactor 130 first locks up in a circuit which includes its contacts 134, the break contacts 122, the contacts 56 of the selector switch 54 and the contacts of the limit switch 53. Thereafter, the contactor 130 opens its contacts 133 to interrupt its operating circuit. At its contacts 132, the contactor 130 completes a circuit through the contacts 112, 62 and 56 and the contacts of the limit switch 53 for energizing the feed left contactor 140. At its contacts 135, the contactor 130 prepares an operating circuit for the contactor 180 and a circuit for energizing the operating winding of the timer 190.

The contactor 140, upon operating, closes its contacts 142 to complete a locking circuit for itself through the contacts 62 and 56 and the contacts of the limit switch 53. At its contacts 143, the contactor 140 opens a point in the prepared circuit for energizing the windings of the contactor 180 and the timer 190 in parallel. At its contacts 141, the contactor 140 connects the winding terminals 48 of the feed motor 14 to the current source 16, thereby to energize the feed motor with current of the proper phase to drive the work support 10 to the left back to the preselected position. As explained above, however, during the period required to stop the work support 10 through the plugging action of the rapid traverse motor 13, the worm gear 43 is declutched from the shaft 20 so that operation of the motor 14 is without effect.

When the work suport 10 is brought to a stop at the point B indicated in the operation chart shown in Figure 12 of the drawings, the motor 13 is deenergized in the manner explained above. The spring 43c now functions to produce engagement of the clutch teeth 97a and 102a in the manner explained above, thereby to establish a driving connection between the worm 42 and the shaft 20. This driving connection results in movement of the work support 10 back to the preselected position A. Movement of the work support in this direction continues at a medium speed indicated by the amplitude of the saw tooth variations E in the chart of Figure 12 until the table is again moved exactly into the preselected position A. When this position is reached, the lever mechanism 67 is actuated under the influence of the spring 91 to effect operation of the Microswitch 60, such that the contacts 62 thereof are again opened and the contacts 61 thereof are reclosed. In response to opening of the contacts 62, the contactor 140 is deenergized and restores. At its contacts 141, this contactor disconnects the feed motor winding terminals 48 from the source 16. At its contacts 142, the contactor 140 opens another point in its own locking circuit. At its contacts 143, the contactor 140 closes the prepared circuit for energizing the operating windings of the contact 180 and the timer 190 in parallel, this circuit also including the contacts 135 of the energized contactor 130, the contacts 61 of the microswitch 60, the contacts 56 of the selector switch 54 and the contacts of the limit switch 53.

At the instant the feed motor 14 is thus deenergized under the control of the contactor 140, the kinetic energy stored in the moving parts of the machine is sufficient to effect carryover movement of the work support 10 to a position approximately .005 inch to the left of the preselected position. The purpose of energizing the contactor 180 and the timer 190 is to energize the feed motor 14, thereby to stop the work support and then bring the work support back to the exact preselected position A. To this end, the contactor 180, in operating, closes its contacts 181 to connect the slow speed winding terminals 47 of the feed motor 14 to the current source 16 in the proper phase relationship to drive the work support 10 to the right. When the operating winding of the timer 190 is energized, this timer first opens its contacts 192 and then closes its contacts 193, thereby to prepare a circuit for energizing the plug left contactor 120.

As indicated above, the reversed phase energization of the feed motor 14 serves two purposes. First, the motor 14 acts to brake the work support 10 and the other moving parts of the machine to a stop at approximately the point C along the operating chart shown in Figure 12, following which the motor functions to drive the work support 10 back to the preselected position A at the very slow speed indicated by the amplitude of the saw tooth line F shown in Figure 12. When the work support 10 is thus returned to the preselected position A, the Microswitch 60 is again actuated to effect opening of the contacts 61 and reclosure of the contacts 62. When the contacts 61 are opened, the operating windings of the contactor 180 and the timer 190 are deenergized. Reclosure of the contacts 62 is without effect. The contactor 180, in releasing, opens its contacts 181 to deenergize the feed motor 14. Since the work support 10 is moving at an exceedingly slow speed at the time the feed motor is thus deenergized, the carryover movement beyond the preselected position is substantially negligible. From the above description it will be apparent that the support 10 effectively hunts about the preselected position A at decreasing amplitudes until the final preselected position is attained.

When the operating winding of the timer 190 is deenergized, this timer acts to first close its contacts 192 and then opens its contacts 193 a predetermined time interval thereafter. During this interval the contactor 120 is energized in an obvious circuit and closes its contacts 121 reversely to connect the slow speed winding terminals 47 to the source 16. Thus operation of the motor 14 is initiated in the proper direction to drive the work support 10 to the right. Such operation is continued, however, only for an interval sufficient to relax the driving connection between the motor 14 and the work support 10, i. e. to remove from the work support all forces acting thereon thus leaving this support floating freely upon the bed 80. This interval is measured by the operation of the timer 190 which opens its contacts 193 a predetermined interval following closure of its contacts 192. When the contacts 193 are opened the contactor 120 is deenergized and restores to open its contacts 121, thereby to deenergize the feed motor 14. Thus, the work support 10 is left standing exactly in the desired preselected position.

When operated in the manner explained above, the contactor 120 opens its contacts 122 to deenergize the contactor 130. Release of the latter contactor is without effect. Following release of the contactor 120 in the manner explained above, the control circuit 50 is fully restored to normal in readiness for another operating cycle.

In practice, in order to check the accuracy of the indicating gauge and associated connections, the apparatus may be put through the above described operating cycle. This is preferably done at the outset for locating the first position at which the support is to be stopped. If the indicating pointer of this gauge is not indexed exactly with the zero point of the gauge scale, the micrometer screw 65 should be adjusted until an exact zero reading of the gauge 84 is provided. After this adjustment is made, the exact desired relationship between the position of the work piece 11 and the position responsive elements 60 and 84 is established. Moreover, the work piece 11 carried by the work support 10 is accurately positioned so that the center of the hole H—I, which it is desired to bore, is in exact vertical alignment with the axis of the tool spindle 12a. With the work support 10 thus accurately positioned in the desired preselected position, this support may be clamped to the bed 80 in any conventional manner in order to prevent inadvertent movement thereof out of the preselected position. In this position the metal working operation is performed. If the operation is boring, it may be desired to withdraw the boring tool and back the work support away in order to measure the work. Now, upon returning the work support to position again for a following operation, the automatic cycle is repeated, resulting in moving the work support to the exact position which it occupied at the time of the previous boring operation. In actual practice the precision of this automatic re-positioning is within .0002" and tests have shown such re-positioning to be within .00002", the latter dimension requiring a light band instrument for measurement.

The manner in which the described positioning facilities may be utilized in moving the tool support 12 to the desired position relative to the work piece 11 is exactly the same as explained above with reference to positioning of the work support 10. In this regard it will be understood that to condition the positioning facilities for operation of the tool support 12, the clutch actuator 40 is operated to disengage the teeth of the clutch sleeve 24a from the teeth of the clutch sleeve 24b and to effect engagement between the clutch teeth of the two sleeves 24a and 24c. In response to this operation the driving connection between the shaft 20 and the lead screw 30 is broken and a driving connection is established between the shaft 20 and the lead screw 34. Concurrently therewith, the selector switch 54 is operated through the uni-control connection indicated at U in Figure 1 to open its contacts 56 and close its contacts 55, thereby to substitute the Microswitch 68 carried by the tool support 12 for the Microswitch 60 associated with the work support 10 in the control circuit 50. Specifically, shifting of the selector switch 54 to its second setting renders the contacts 70 of the Microswitch 68 operative to perform the same functions as the contacts 61 of the Microswitch 60 and renders the contacts 69 operative to perform the same functions as the contacts 62 of the Microswitch 60 in the sequence of operations referred to above. Thus, the control circuit 50 is fully conditioned to control the rapid traverse and feed motors 13 and 14 in their operation to move the tool support 12 to a position which will bring the axis of the work spindle 12a in exact alignment with the center of the hole H—1. This position is established through appropriate use of one or more micrometer blocks 71 and appropriate adjustment of the microscrew 73 in the manner previously explained. Following these preparatory operations, the automatic position switch 59 may be momentarily actuated to initiate automatic positioning of the tool support 12, which positioning proceeds exactly in accordance with the above explanation.

After the axis of the tool spindle 12a has thus been brought into exact alignment with the center of the hole H—1 which it is desired to bore, the boring operation may be carried out in an entirely conventional manner. Following the boring operation, or in the course thereof, the work support 10 may be moved back to permit measuring of the inside diameter of the hole. To this end, the work support 10 is first unclamped from the bed 80, following which the clutch actuator 40 is shifted to break the driving connection between the shaft 20 and the vertical lead screw 34, reestablish the driving connection between the shaft 20 and the horizontal lead screw 30 and shift the selector switch 54 to a position wherein its contacts 56 are closed and its contacts 55 are opened. The self-restoring push button switch 57 may now be actuated to complete a circuit through the contacts of the limit switch 51 for energizing the contactor 100. In operating, this contactor closes its contacts 101 to connect the high speed winding terminals 45 of the rapid traverse motor 13 to the source 16 in the proper phase relationship to effect rapid traverse movement of the work support 10 to the left. This movement is continuous so long as the switch 57 is held in its closed circuit position, but cannot exceed the limit of the travel of the work support 10 to the left. Thus, upon approaching this limit of its range of travel, the work support 10 actuates the limit switch 51 to its open circuit position to effect successive deenergization of the contactor 100 and rapid traverse motor 13, thereby to arrest movement of the work support 10 in the indicated direction. Normally, the switch 57 will be released before the limit switch 51 is operated. When released, the operating circuit for the contactor 100 is opened to effect release of this contactor and deenergization of the motor 13, thereby to arrest movement of the table 10 to the left away from the preselected position.

After the described hole measuring operation is completed the work support 10 may be moved back to the preselected position by again actuating the automatic position switch 59 to initiate the above described sequence of operations, it being noted that movement of this support is arrested only when the support is returned exactly to the preselected position wherein the center of the hole H—1 is in exact alignment with the axis of rotation of the tool spindle 12a.

If it is desired to move the work support 10 to the right to a position falling short of the preselected position, this may be accomplished by actuation of the self-restoring push button switch 58, assuming that the clutch 24 is maintained in a postion wherein the driving connection is established between the shaft 20 and the horizontal lead screw 30. When this switch is operated, a circuit is completed through the contacts 61 and 56, and the contacts of the limit switch 53 for energizing the contactor 150. In operating, this contactor closes its contacts 151 to connect the high speed winding terminals 45 of the rapid traverse motor 13 to the source 16 in the proper phase relationship to drive the work support 10 to the right. Such movement of the work support 10 continues until the switch 58 is released or until the Microswitch 60 is operated to open its contacts 61 through actuation of the lever mechanism 67 by the micrometer block or blocks 66. In either case, the contactor 150 is deenergized and opens its contacts 151 to deenergize the rapid traverse motor 13 and thus arrest movement of the work support 10. Thus, it will be apparent that the Microswitch 60 serves to prevent the work support 10 from being moved to the right substantially beyond the preselected position. Return movement of the work support to the left to a position wherein the automatic positioning facilities may be effectively used in returning this support to its preselected position, may of course be obtained in response to actuation of the push button switch 57 in the manner explained above.

Movement of the work support 10 to the right beyond the limit of its range of movement is prevented, independently of the Microswitch 60, through the action of the limit switch 53. Specifically, this switch is arranged to open a point in the common portion of the circuits for energizing the contacts 130, 140, 150, 170 and 180 and the operating windings of the two timers 160 and 190 when it is actuated in response to movement of the work support 10 through the right limit of its range of travel. Interruption of any completed one or ones of these circuits serves to arrest movement of the work support 10 to the right in a manner fully apparent from an inspection of the circuit.

The manner in which the tool support 12 may be operated independently of the automatic positioning facilities and under the selective control of the contactors 100 and 150 and their associated energizing switches 57 and 58 at a time when the clutch mechanism 24 is appropriately shifted to establish a driving connection between the shaft 20 and the vertical lead screw 34 is exactly the same as explained above. In this regard it is pointed out that the limit switch 52 serves the function of preventing the tool support 12 from being moved beyond the lower limit of its range of travel and thus corresponds in function to the limit switch 53.

After the hole H—1 has been bored, additional holes may be bored as desired in accurately spaced relationship relative to the hole H—1. For example, if it is desired to bore a hole H—2 the center of which is horizontally aligned with the center of the hole H—1 but is spaced therefrom a distance of 2.003 inches, the work support 10 is first moved to the left approximately 2½ inches to provide a space for insertion of a micrometer block in the trough 63b between the end of the block 66 and the engageable end of the lever 85. This added block is accurately set to measure exactly 2.003 inches between the end surfaces thereof. After being positioned in the trough 63 ahead of the micrometer block or blocks used in the first hole drilling operation, the switch 59 may be momentarily operated to effect operation of the automatic positioning facilities in the manner explained above. In this case the work support 10 is stopped exactly 2.003 inches ahead of the position which it previously occupied during boring of the hole H—1. Accordingly, after the work support 10 is clamped to the bed 80, the second hole H—2 may be bored in the usual manner. If, after boring the hole H—2, it should be desired to reposition the hole H—1 in alignment with the boring tool, this may be accomplished by merely removing the added micrometer block of 2.003 inch length from the trough 63 and again actuating the automatic positioning switch 58. In response to this operation the positioning facilities function to return the work support 10 to the initial preselected position wherein the center of the hole H—1 is in exact alignment with the axis of rotation of the tool spindle 12a. The above described hole boring operations may be repeated to produce as many holes as desired which may be in horizontal or vertical alignment or may be spaced both vertically and horizontally. In any case, however, the described automatic positioning facilities serve to insure exact vertical and horizontal spacing of the centers between the holes bored.

In actual practice of the invention as applied to a boring and milling machine such as shown in the drawings, the rate of travel of the work support when propelled by the rapid traverse motor in the rapid traverse portion of the cycle at D, Figure 12, is 49" per minute. This rapid traverse rate may be varied, as is cutomary in machine tool practice, to suit the particular type of machine or the nature of the work. The fast feed rate of the support when propelled by the feed motor operating at 1200 R. P. M. as noted at E, is .7" per minute. The slow feed rate noted at F, is .24" per minute. These rates are illustrative of the principle of operation as applied in the present machine, and it should be understood that the invention may be applied in many modifications. For example, any equivalent structures may be used to perform the several functions. Also, the automatic positioning may be accomplished in response to manual or push-button control either with or without rapid traverse movement of the support, or such automatic positioning may be under full automatic control as disclosed herein. Furthermore, the invention in its broader phase contemplates automatic positioning without reversal of travel of the support. That is, it contemplates any suitable approach of the support toward the ultimate point, then reduction by one or more stages to the desired low rate of feed, and then plugging of the motor into reverse as in the final operation of the full cycle above described. In other words, the cycle may be varied prior to this final operation. This final operation accomplishes a new result in that the plug to reverse serves to relieve and relax all strains on the mechanism, leaving the support at rest in the ultimate position. This final operation may be performed in the broader phase of our invention, regardless of whether the feed is reversed to correspondingly move the support. The last slow feed, terminating in plug of the motor to reverse, brings the support to the preselected point and eliminates any tendency of the support to coast forward or beyond such ultimate position. It also avoids any tendency of the support against displacement from stress or strain in the driving train. The support is, therefore, located to a high degree of precision in the predetermined position. The support should immediately be clamped in this position by suitable clamping means. In embodiments wherein there is one or more reverse feeds of the support a further advantage results from the final reverse movement which serves to smooth the oil film between the support and its ways and thereby promote greater accuracy in the final location of the support.

While we have shown what is at present considered to be a preferred embodiment of the invention, it will be understood that various modifications may be made which are within the true spirit and scope of the invention as defined in the appended claims.

We claim:

1. In a machine tool, a tool or work support movable to a preselected position, means for moving said support, and means controlled by movement of said support for controlling said moving means to repeatedly reverse the direction of movement of said support in moving said support into said preselected position so as effectively to hunt about said preselected position.

2. In a machine tool, a tool or work support movable to a preselected position, motor means moving said support, driving means providing a driving connection between said motor means and said support, and means controlled by movement of said support for controlling said motor means repeatedly to reverse the direction of movement of said support in moving said support into said preselected position and to decrease the speed of movement of said support each time the direction of movement thereof is reversed.

3. In a machine tool, a tool or work support movable to a preselected stationary position, motor means for moving said support, driving means providing a driving connection between said motor means and said support, means for controlling said motor means to reverse the direction of movement of said support in moving said support into said preselected position, and means responsive to movement of said support into said preselected position for controlling said motor means to relax said driving connection.

4. In a machine tool, a tool or work support movable to a preselected stationary position, motor means for moving said support, driving means providing a driving connection between said motor means and said support, means controlled by movement of said support for controlling said moving means to repeatedly reverse the direction of movement of said support in moving said support into said preselected position, and means responsive to movement of said support into said preselected position for controlling said motor means to relax said driving connection.

5. In a machine tool, a tool or work support movable to a preselected stationary position, motor means for moving said support, driving means providing a driving connection comprising a plurality of gears and interrelated driving means between said motor means and said support, means for controlling said motor means to move said support into said preselected position, and means responsive to movement of said support into said preselected position for relaxing said driving connection.

6. In a machine tool, a tool or work support movable to a preselected stationary position, motor means for moving said support, driving means providing a driving connection comprising a plurality of gears and interrelated driving means between said motor means and said support, means for controlling said motor means to move said support into said preselected position, and means responsive to movement of said support into said preselected position for controlling said motor means to relax said driving connection.

7. In a machine tool, a tool or work support movable to a preselected stationary position, motor means for moving said support, driving means providing a driving connection between said motor means and said support, means for controlling said motor means to reverse the direction of movement of said support in moving said support into said preselected position and to decrease the speed of movement of said support incident to reversal in the direction of movement thereof, and means responsive to movement of said support into said preselected position for controlling said motor means to relax said driving connection.

8. In a machine tool, a tool or work support movable to a preselected position, motor means for moving said support, driving means providing a driving connection between said motor means and said support, means controlled by movement of said support for controlling said moving means to repeatedly reverse the direction of movement of said support in moving said support into said preselected position and to decrease the speed of movement of said support each time the direction of movement thereof is reversed, and means responsive to movement of said support into said preselected position for controlling said motor means to relax said driving connection.

9. In a machine tool, a tool or work support movable to a preselected position, motor means for moving said support, driving means providing a driving connection between said motor means and said support, means for energizing said motor means to move said support through said preselected position in one direction, means responsive to movement of said support into said position for controlling said motor means to plug said support to a stop and then reversely move said support through said position, and means responsive to the reverse movement of said support into said position for controlling said motor means to plug said support to a stop and then reversely move said support back to said position.

10. In a machine tool, a tool or work support movable to a preselected position, motor means for moving said support, driving means providing a driving connection between said motor means and said support, means for energizing said motor means to move said support through said preselected position in one direction, means responsive to movement of said support into said preselected position for controlling said motor means to plug said support to a stop and then reversely move said support at reduced speed through said preselected position, and means responsive to the reverse movement of said support into said preselected position for controlling said motor means to again plug said support to a stop and then reversely move said support back to said preselected position at a still slower speed.

11. In a machine tool, a tool or work support movable to a preselected position, motor means for moving said support, driving means providing a driving connection between said motor means and said support, means for energizing said motor means to move said support through said preselected position in one direction, means responsive to movement of said support into said position for controlling said motor means to plug said support to a stop and then reversely move said support through said position, means responsive to the reverse movement of said support into said position for controlling said motor means to plug said support to a stop and then reversely move said support back to said position, and means responsive to said movement of said support back to said position for relaxing said driving connection.

12. In a machine tool, a tool or work support movable to a preselected position, motor means for moving said support, driving means providing a driving connection between said motor means and said support, means for energizing said motor means to move said support through said preselected position in one direction, means responsive to movement of said support into said preselected position for controlling said motor means to plug said support to a stop and then reversely move said support at reduced speed through said preselected position, means responsive to the reverse movement of said support into said preselected position for controlling said motor means to again plug said support to a stop and then reversely move said support back to said preselected position at a still slower speed, and means responsive to said movement of said support back to said position for controlling said motor to relax said driving connection.

13. In a machine tool, a tool or work support movable to a preselected position, reversible rapid traverse and feed motors for driving said support at fast and slow speeds respectively, driving means providing driving connections between said motors and said support, means for energizing said rapid traverse motor to move said support through said preselected position in one direction, means responsive to movement of said support into said preselected position for energizing said rapid traverse motor to plug said support to a stop and for energizing said feed motor to drive said support toward said preselected position in the reverse direction, means for deenergizing said rapid traverse motor when movement of said support is stopped, and clutch means included in said driving means and operative to establish a driving connection between said feed motor and said support only in response to deenergization of said rapid traverse motor.

14. In a machine tool, a tool or work support movable to a preselected position, reversible rapid traverse and feed motors for driving said support at fast and slow speeds respectively, driving means providing driving connections between said motors and said support, means for energizing said rapid traverse motor to move said support through said preselected position in one direction, clutch means included in said driving means to break the driving connection between said feed motor and support in response to energization of said rapid traverse motor, means responsive to movement of said support into said preselected position for energizing said rapid traverse motor to plug said support to a stop and for energizing said feed motor to drive said support through said preselected position in the reverse direction, means for deenergizing said rapid traverse motor when movement of said support is stopped, whereby said clutch means is operated to reestablish the driving connection between said feed motor and said support, and means responsive to reverse movement of said support into said preselected position for energizing said feed motor to plug said support to a stop and then reversely move said support back to said preselected position.

15. In a machine tool, a tool or work support movable to a preselected position, reversible rapid traverse and feed motors for driving said support at fast and slow speeds respectively, driving means providing driving connections between said motors and said support, means for energizing said rapid traverse motor to move said support through said preselected position in one direction, clutch means included in said driving means to break the driving connection between said feed motor and support in response to energization of said rapid traverse motor, means responsive to movement of said support into said preselected position for energizing said rapid traverse motor to plug said support to a stop and for energizing said feed motor to drive said support through said preselected position in the reverse direction, means for deenergizing said rapid traverse motor when movement of said support is stopped, whereby said clutch means is operated to reestablish the driving connection between said feed motor and said support, means responsive to reverse movement of said support into said preselected setting for energizing said feed motor to plug said support to a stop and then reversely move said support back to said preselected position, and means responsive to movement of said support back to said preselected position for controlling said feed motor to relax the driving connection between said feed motor and said support.

16. In a machine tool, a tool or work support movable to a preselected position, a rapid traverse motor for driving said support at a high speed, a reversible two speed feed motor for driving said support at a slower speed, driving means providing driving connections between said motors and said support, means for energizing said rapid traverse motor to move said support through said preselected position in one direction, clutch means included in said driving means to break the driving connection between said feed motor and support in response to energization of said rapid traverse motor, means responsive to movement of said support into said preselected position for energizing said rapid traverse motor to plug said support to a stop and for energizing said feed motor for its highest speed operation to drive said support through said preselected position in the reverse direction, means for deenergizing said rapid traverse motor when movement of said support is stopped, whereby said clutch means is operated to reestablish the driving connection between said feed motor and said support, means responsive to reverse movement of said support into said preselected position for energizing said feed motor for slow speed operation in the reverse direction, thereby to plug said support to a stop and then reversely move said support back to said preselected position, and means responsive to movement of said support back to said preselected position for energizing said feed motor for limited reverse slow speed operation, thereby to relax the driving connection between said feed motor and said support.

17. In a machine tool, a tool or work support movable to a preselected position, a reversible two speed rapid traverse motor for driving said support at high speed, a feed motor for driving said support at a slower speed, a position responsive switch operated each time said support is moved through said preselected position, means in part controlled by said switch for successively effecting slow speed operation of said rapid traverse motor and operation of said feed motor to move said support into said preselected position, a second switch, a circuit controlled jointly by said switches, and means included in said circuit for controlling said rapid traverse motor to effect high speed movement of said support in one direction to an extent limited by the operation of said position responsive switch.

18. In a machine tool, a tool or work support movable to a preselected stationary position, motor means for driving said support, a position responsive switch operated each time said support is moved through said preselected position, means in part controlled by said switch for controlling said motor means to move said support into said preselected position, a second switch, a circuit jointly controlled by said switches, and means included in said circuit for controlling said motor means to effect movement of said support in one direction to an extent limited by the operation of said position responsive switch.

19. In a machine tool, a tool or work support movable to a preselected position, reversing motor means for driving said support, and a position responsive switch arranged for controlling said motor means and actuated in response to movement of said support to effect plugging the motor means to reverse the direction of movement of said support to effect the final movement of the support to its ultimate position and to relax the driving connection between said motor means and said support.

20. In a machine tool, a tool or work support movable to a preselected position, motor means for moving said support, driving means providing a drive connection between said motor means and said support, and means responsive to movement of said support for controlling said motor means to move said support into said preselected position including a control circuit for said motor means having a stationary limit switch, lever mechanism actuated by movement of said support and arranged to actuate said limit switch, a micrometer gauge coacting with said limit switch and said lever mechanism, and means responsive to movement of said lever mechanism upon movement of said support into said preselected position for relaxing said driving connection.

21. A machine tool as set forth in claim 20, in which the lever mechanism includes a lever arm arranged to be actuated by a micrometer block or the like carried on the support, a lever arm arranged for actuating said micrometer gauge, and a lever arm arranged for actuating said limit switch.

22. A machine tool as set forth in claim 20, in which the lever mechanism includes a lever arm arranged to be actuated by a micrometer block or the like carried on the support, a lever arm arranged for actuating said micrometer gauge, and a lever arm arranged for actuating said limit switch, and means for biasing the lever mechanism to a zero reading position of the micrometer gauge.

23. A machine tool as set forth in claim 20, in which the lever mechanism includes a lever arm arranged to be actuated by a micrometer block or the like carried on the support, a lever arm arranged for actuating said micrometer gauge, and a lever arm arranged for actuating said limit switch, and means for biasing the lever mechanism to a zero reading position of the micrometer gauge, said biasing means arranged to exert biasing forces in opposite directions, one to said zero reading position and the other to hold the first mentioned lever arm in a position removed from the path of said micrometer block.

24. In a machine tool, a tool or work support movable to a preselected position, motor means for moving said support, driving means providing a drive connection between said motor means and said support, and means responsive to movement of said support for controlling said motor means to move said support into said preselected position including a control circuit for said motor means having a stationary limit switch, lever mechanism actuated by movement of said support and arranged to actuate said limit switch, a micrometer gauge in co-action with said limit switch and said lever mechanism, and means responsive to movement of said lever mechanism upon movement of said support into said preselected position for releasing said driving connection, said lever mechanism including a lever arm arranged to be actuated by a micrometer block or the like carried on the support, a lever arm arranged for actuating said micrometer gauge, and a lever arm arranged for actuating said limit switch, and means for biasing the lever mechanism to a zero reading position of the micrometer gauge, said biasing means arranged to exert biasing forces in opposite direction, one to said zero reading position and the other to hold the first mentioned lever arm in a position removed from the path of said micrometer block.

25. In a machine tool, a work support movable to a preselected position, a tool support movable to a preselected position in a plane transverse to said work support movement, a feed motor, a rapid traverse motor, drive gearing arranged for optional connection between said feed motor and either said work support or said tool support and comprising a driving worm meshing with a worm gear and a displaceable clutch element driven by said worm gear, and an overrunning drive connection from said rapid traverse motor to said drive gearing arranged to overrun the drive from the feed motor and to drive either the work support or the tool support at the rapid traverse rate, said over-running drive connection being arranged to effect displacement of said clutch element when a torque is transmitted from said rapid traverse motor to said support.

26. In a machine tool, a tool or work support movable to a preselected position, a rapid traverse motor and a feed motor for driving said support at fast and slow speeds respectively, driving means providing driving connections between said motors and said support, means for energizing said rapid traverse motor to move said support in a direction approaching said preselected position, and means responsive to rapid traverse movement of said support to energize said feed motor to drive said support toward said preselected position, to effect stopping of said support at said preselected position, and to relax the driving connection between the feed motor and the support, said driving means including an overrunning clutch between the rapid traverse motor and the drive to said support arranged to overrun the driving means from the feed motor.

27. In combination, a tool or work support movable to a preselected position, means for moving said support, means for causing said support automatically and accurately to assume said preselected position comprising reversing means for reversing the direction of movement of said support in moving toward said preselected position, said reversing means being actuated just as said support reaches said preselected position, whereby the inertia of said moving support causes it to move beyond said preselected position, and means for decreasing the speed of movement of said support incident to operation of said reversing means.

28. For use with a machine of the type having a movable tool or work support and power means for moving said support, automatic positioning control means for accurately stopping said support at a preselected position comprising, power means reversing means, multispeed control means for causing said power means to move said support at different predetermined speeds, and support position responsive means controlling said reversing means and said multispeed control means when said support is in proximity to said preselected position to reverse the direction of movement of said support and to change the speed at which said support is moved prior to stopping said support at said preselected position.

29. For use with a machine of the type having a movable tool or work support and power means for moving said support, automatic positioning control means for accurately stopping said support at a preselected position comprising, power means reversing means, control means for rendering said power means ineffective to move said support, multispeed control means for causing said power means to move said support at different predetermined speeds, and support position responsive means controlling said reversing means said control means and said multispeed control means and operative when said support is in proximity to said preselected position to reverse the direction of movement of said support and simultaneously therewith to vary the speed of said support, and then to terminate the drive of said support to stop said support at said preselected position.

30. In combination, a tool or work support movable to a preselected position, multispeed multidirection power means for controlling the movement of said support, and support position responsive means for repeatedly changing the direction and speed of movement of said support when in proximity to said preselected position prior to stopping said support accurately at said preselected position.

31. In combination, a movable tool or work support, multispeed power means for moving said support, automatic positioning control means for accurately stopping said support at a preselected position comprising power means reversing means, control means for rendering said power means ineffective to move said support, support position responsive means controlling said reversing means and said control means operative when said support is in proximity to said preselected position to reverse the direction of movement of said support and then to terminate the drive of said support to stop said support at said preselected position, and means for decreasing the speed of movement of said support simultaneously with the reversal of direction of movement thereof.

32. In a combination, a movable element movable to be stopped with a high degree of accuracy at a preselected position relative to a fixed support, motor means for moving said element, driving means providing a driving connection between said motor means and said element, means for controlling said motor means to reverse the direction of movement of said element in moving said element into said preselected position relative to said support, means for actuating said last mentioned means when said element moves into proximity of said preselected position, and means responsive to stopping of said element in said preselected position for promptly causing deenergization and stopping of said motor.

33. Apparatus for automatically positioning to a high degree of accuracy a movable member at any position along a particular path of travel relative to a fixed support, comprising, motive means for moving said member in one direction along said path at relatively fast and slow rates of speed and for reversing the direction of movement of said member along said path, selecting means for preselecting the ultimate position of said member along said path, control means for controlling said motive means, means for rendering said control means effective to cause a reversal of said motive means in response to movement of said movable member in one direction along said path at said relatively fast rate of speed into proximity of said ultimate position as determined by the setting of said selecting means and for thereafter causing said member to approach said ultimate position from the opposite direction, and means incident to changing the direction of movement of said member along said path for also changing its speed of movement from said fast rate to said slow rate.

34. Apparatus for automatically positioning to a high degree of accuracy a movable member at any position along a particular path of travel relative to a fixed support, motor means for moving said member, driving means providing a driving connection between said motor means and said member, reversing means for reversing the direction of movement of said member by said motor means, selecting means for preselecting the ultimate position of said member relative to said support, control means for controlling said motor, means to move said member at fast and slow speeds including an actuable element for rendering said control means effective to perform a control function on said motor means, means for causing said actuable element to render said reversing means effective, means for effectively positioning said actuable element at said ultimate position, and means responsive to movement of said member through said ultimate position of operating said actuable element to render both said reversing means and said control means effective whereby said member moves back toward said ultimate position from the opposite direction and at a different speed than when it first moved through said ultimate position.

CHARLES B. DE VLIEG.
EUGENE E. STEGNER.

REFERENCES CITED

The following references are of record in the file of this patent:

UNITED STATES PATENTS

| Number | Name | Date |
|---|---|---|
| 1,323,267 | Hanson | Dec. 2, 1919 |
| 1,757,929 | Shaw et al. | May 6, 1930 |
| 1,942,209 | Graves et al. | Jan. 2, 1934 |
| 1,988,267 | Dumser | Jan. 15, 1935 |
| 2,007,180 | Doran et al. | July 9, 1935 |
| 2,029,335 | Oberhoffken et al. | Feb. 4, 1936 |
| 2,123,825 | De Vlieg | July 12, 1938 |
| 2,134,743 | Strawn | Nov. 1, 1938 |
| 2,142,439 | Forward | Jan. 3, 1939 |
| 2,158,649 | Armitage | May 16, 1939 |
| 2,198,102 | Armitage | Apr. 23, 1940 |
| 2,224,107 | Ridgway | Dec. 3, 1940 |
| 2,329,756 | Granberg et al. | Sept. 21, 1943 |
| 2,339,435 | Stephan | Jan. 18, 1944 |
| 2,370,222 | Bennett et al. | Feb. 27, 1945 |
| 2,398,346 | Anderson | Apr. 16, 1946 |